Patented Feb. 12, 1924.

1,483,468

UNITED STATES PATENT OFFICE.

ALBERT P. MEYER, OF PITTSBURGH, PENNSYLVANIA, ASSIGNOR TO ALLEN S. DAVISON COMPANY, OF PITTSBURGH, PENNSYLVANIA, A CORPORATION OF PENNSYLVANIA.

BASIC REFRACTORY AND PROCESS OF MAKING SAME.

No Drawing.  Application filed January 25, 1922. Serial No. 531,764.

*To all whom it may concern:*

Be it known that I, ALBERT P. MEYER, a citizen of the United States, residing at Pittsburgh, in the county of Allegheny and State of Pennsylvania, have invented certain new and useful Improvements in Basic Refractories and Processes of Making Same, of which the following is a specification.

This invention relates to basic refractories and processes of making same; and it comprises a new material for lining basic open hearth furnaces composed of individually fired and compacted angular grains, each composed of an intimate and uniform admixture of a magnesian refractory material with a binder; and it also comprises a method of making this material wherein finely powdered dolomite, or magnesite is brought to a standardized composition as regards fluxing impurities, the mixture is compacted into a cake by pressure (advantageously in the presence of water) and dried, the dried material is broken into angular granules and the angular granules fired at a high temperature; all as more fully hereinafter set forth and as claimed.

In a basic hearth furnace the bottom is covered with a granular layer or bed of basic refractory material; this lining extending upward beyond the slag line to form a basin-shaped hearth in which the molten iron and molten slag are contained. Although made of granular material, the bed as a whole must have a considerable degree of coherence, rigidity and mechanical strength in order to stay in place and retain its shape; and this in turn requires that the granules composing it shall adhere or bond among themselves with considerable tenacity. These requirements are in a measure conflicting since while the bed must not fuse or soften materially at any furnace temperature yet the individual granules must yield to the heat sufficiently to develop a certain amount of superficial stickiness or adhesiveness; enough to cause them to bond when pressed together. And in this respect the properties of the refractory necessarily represent a sort of compromise.

Magnesia and magnesian lime (burnt dolomite) are the materials generally used, but neither is applicable in a pure state being then entirely too refractory. The presence of more or less "impurity" is necessary to act as a sort of fluxing agent, diminishing the refractoriness somewhat and permitting development of bond at open hearth temperature. Iron oxid, alumina and silica are the impurities generally found in this class of materials and all three have a fluxing power on magnesia. It is however difficult to find material with the right amount of impurity, neither more nor less, associated with the magnesia or magnesian lime; and in the right state of intimate association therewith. With too little the refractory will not bond; with too much, it yields under the heat of the furnace. For many years the standard material has been certain grades of Austrian magnesite; a native magnesium carbonate containing small amounts of impurity distributed therethrough in a fine state of subdivision. The material occurs in seams or bodies of varying composition and to obtain the commercial article the product of the quarries is hand picked; fragments of undue purity or impurity being discarded. The selected material is, naturally, not very uniform.

Magnesite is not a particularly rare mineral and there are many deposits in this country. In addition, much magnesia is, or can be, produced by chemical methods from various sources, sea water, salt spring bitterns, dolomite, etc. Unfortunately most of this material is too pure for the present purposes; it does not contain the limited amount of impurity in even dissemination which characterizes the Austrian magnesite.

Many methods have been proposed, and some actually used, for making artificial or synthetic basic refractories having the composition and properties of Austrian magnesite. For the most part these propositions, so far as they relate to the production of a granular refractory, have not been eminently successful. As a rule the magnesite is finely powdered, mixed with a small amount of fine powdered oxid of iron, etc. and sent through an inclined rotary kiln of the type used for burning cement.

The pulverulent mixture if of the right composition for open hearth furnaces is composed of highly refractory particles and these do not interact to any great extent in the time and at the temperature afforded in this kiln firing; not sufficiently so to give the hard, dense material wanted. Magnesite and oxid of iron being of quite different specific gravity, there is a tendency to segregate as the particles tumble slowly down the kiln; and such sintering or clinkering as takes place is where there is a local enrichment in flux. The product coming from the kiln is rounded or balled open textured aggregates of imperfectly united particles. It has but little mechanical strength.

In the open hearth furnace a ball shape, or any substantial roundness of the granule, is quite objectionable; first because it does not give the mechanical interlocking which is necessary for a firm bed in the open hearth and which can be secured with angular granules, and secondly because the granules roll more or less when pitched into place. In the furnace, repairs are most frequently required at the slag line; and in pitching round-grained material into place across the furnace, it is hard to prevent a considerable proportion of the grains rolling down on the bottom of the furnace. Sometimes it is necessary to shut down the furnace to cut down bottoms built up in this way.

In the present invention I have modified this procedure by adding an intermediate step by which I secure a hard dense and firm structure before I fire the material. The fine ground magnesite of magnesia and bonding agent of correct chemical composition are formed into a hard cake with the aid of water and pressure and this cake is again broken up to give angular, flat faced and sharp edged granules which will have the chemical composition to give an ultimate product of the correct composition on firing and which will be of a size and shape giving the correct ultimate size and shape upon shrinking.

If the material has been dry ground I add to it enough water to bring it to a mud or slurry. Wet ground material usually requires a further addition of water to get it thin enough for my purposes. In the present process this water acts as a lubricant and facilities producing intimate contact of the particles in pressing. Ordinarily I next pump this thin material into an apparatus of the type of an ordinary filter press, pumping under heavy pressure, say 150 pounds per square inch. The watery magma may be thickened in the commercial "thickeners" and then subjected to pressure in a brick press, but this is less convenient and satisfactory. After forming the cake I remove it from the apparatus and break it up more or less. I then dry it, either by exposure to the air or by artificial heat until it becomes hard and rigid. It is then broken up by a jaw press or in other suitable means to give an angular granular product. Fines separated by the screens are sent back for reuse in the process. The angular granules are fired in the manner stated. By the use of plenty of water and a fairly high pressure, say about 150 pounds, an intimate approximation of particle and particle, with a large area contact therebetween, is obtained and in the kiln there results a thoroughness of action between refractory and flux quite impossible to accomplish where the two go down through the kiln together as, so to speak, separate particles or powders or where a slurry is used. The granules formed from the press cake persist through the firing operation and emerge from the kiln as the final product. There is no tendency to form nodules or rounded aggregates. The action of the water develops what may be called a temporary bond in pressing with formation of a hard, dense cake. The greater the pressure and the finer the grinding, the denser and harder is the cake which can be made. Sometimes I add a little lime to the mixture to aid in getting the temporary bond. If the material is ground so that it will pass a 100 mesh, much of it of course is much finer; and it is possible that colloid phenomena contribute to the formation of the bond and the dense cake. The cake breaks with a somewhat conchoidal fracture and the granules are sharp edged and have slightly curvilinear, practically flat faces; and this shape persists in the firing. Ordinarily I screen to obtain granules of about 7/16 inch. Such fines as are produced are returned to the grinder so there is no loss from this source.

Granules made in this way are, of course, absolutely uniform in composition; each granule is exactly like every other granule. In this respect the present material has an advantage over the Austrian magnesite which is more or less irregular in composition. The firing in the kiln is advantageously at 2800 to 3000° F. or a temperature as much higher as can be secured. The higher the temperature the more thoroughly the material is shrunk and condensed. Any of the usual firing means adapted for high temperatures may be used. A kiln 160 feet long and 6 feet in internal diameter has proved satisfactory. Powdered coal or natural gas may be used for firing. It is advantageous to use preheated air.

The fine grinding of the materials is advantageously as high as 100 mesh and it may be much higher. Either wet or dry grinding may be employed but I find wet grinding better. The magnesite may be employed in the raw or in the calcined state. Ordinarily I use the raw mineral. Instead of magnesite, I may employ magnesia from chemical sources, such as that produced from dolomite by the Pattinson process, that precipitated from seawater or salt spring bitterns by lime or magnesian lime, etc. The purity of such magnesia is here no drawback.

In producing material of standardized composition, it sometimes happens that the run-of-quarry magnesite on fine grinding and averaging by mixing will give the correct analysis; more frequently, this composition can be produced by mixing adjusted proportions of material from different seams and of different analysis. But commonly it is more feasible and convenient to take mineral poorer in fluxing impurities than is desired and bring up the amount by small additions of fluxing substances. In so doing, it is easy to obtain an exact composition. Many materials may be used for such additions such as clay, iron ore, basic slag, other slags, etc., and convenience will usually dictate the selection. Whatever the material added the amount should be such as to make with the impurities naturally present a total of between about 8 and 17 per cent in the burnt product. But I may use as little as 4 per cent or as much as 25 per cent in special instances depending upon the ultimate use of the product. Since magnesium carbonate loses about half its weight in firing (44/84ths) in using magnesite the proportion in the raw mix is about half as great as stated. It is best, as I have so far found, to have all three fluxing agents present and the best ratio between iron oxid, silica and alumina is something like 7:7:2.

Magnesite or magnesia treated in this way gives a product which is of more uniform composition than Austrian magnesite and of better quality. It is, so to speak, a standardized and improved Austrian magnesite.

I regard my invention as covering the production of a granular magnesian refractory composed of small individually fired angular granules of uniform nature and each of standardized composition; whether this material be made of magnesite as so far described, or of magnesian lime or dolomite. Dolomite may be fine ground, mixed with fluxing bodies, formed into a cake with water and pressure, broken into angular fragments and fired in the same way as magnesite. This treatment of dolomite however I do not herein claim specifically it forming the subject matter of another and copending application Serial No. 531,765 filed January 25, 1922.

According to this invention I am able to make large batches of material of the correct chemical composition and therefore I may use pure magnesia and calculate the impurities to be added or if I use impure magnesia I can of course bring up or bring down its purity or impurity as the case may be by the addition of the bonding agent and more pure magnesia as the case may be. The batch once being established the granules are preformed as described, by pressing into cakes, drying and breaking, and then these granules are fired en masse in the firing means which, as stated, may be a rotary kiln. In travelling down the firing means each granule will be individually shrunk and fire-hardened and the interpermeation of the two components of the material perfected. The granules therefore emerge from the firing means in substantially the same shape as when admitted, shrunk and of a definite chemical composition, because the granules do not react chemically upon each other and bonding of granules together does not take place to any substantial extent at the kiln temperature.

The granules are of standardized composition; all the granules in a given batch being of the same composition; and the batch composition being wholly independent of variations in the quarry material. Whatever the source or quality of the raw material which may be used from time to time, the composition and character of the finished product may be made standard by regulating the composition of the batch.

It is sometimes advantageous to add a little magnesia lime or dolomite lime to the mixture of fine ground magnesite and bonding agent; say five or ten per cent or so. The addition of a little lime often adds materially to the strength of the temporary bond, and with some types of magnesite it is highly advantageous.

What I claim is:—

1. As a new basic refractory, an aggregation of hard, dense, angular individually fired granules of uniform nature and standardized composition, such granules being composed of a basic magnesian refractory containing enough intimately distributed fluxing material to permit bonding at open hearth furnace temperatures.

2. As a new basic refractory, an aggregation of hard, dense, angular individually fired granules of uniform nature and standardized composition, such granules being composed of magnesia containing enough intimately distributed fluxing material to permit bonding at open hearth furnace temperatures.

3. The process of making a synthetic refractory for open hearth furnaces which comprises fine grinding a magnesian refractory, admixing a small amount of fluxing material, pressing the mixture in a moist condition to form a firm and hard cake, drying such cake, breaking into angular granules and firing such granules in a rotary kiln at a high temperature.

4. The process of making a synthetic refractory for open hearth furnaces which comprises fine grinding magnesite, admixing a small amount of fluxing material, pressing the mixture in a moist condition to form a firm and hard cake, drying such cake, breaking into angular granules and firing such granules in a rotary kiln at a high temperature.

5. The process of producing granular refractories which comprises preforming granules of substantially the ultimate shape of the finished product from substances which when heated to a high temperature will burn to the ultimate chemical composition of the refractory and firing such preformed granules individually and en masse to burn each granule and shrink the same without mutual reaction of the granules during firing.

6. The process of producing granular basic refractory materials which comprises preforming granules of substantially the ultimate shape of the finished product from magnesian materials and a bonding agent which when heated to a high temperature will burn to the ultimate chemical composition of the refractory desired, and firing such preformed granules individually and en masse to burn each granule and shrink to the utilmate size desired without mutual reaction of the granules during firing.

7. The process of producing magnesian granular refractories which comprises preforming granules of substantially the ultimate shape of the finished product from an intimate mixture of magnesia and a bonding agent which when heated to a high temperature will burn to the ultimate chemical composition of the refractory desired, and firing such preformed granules individually and en masse to burn each granule and shrink the same without mutual reaction of the granules during firing.

8. The process of making basic magnesian refractories for basic open hearth furnaces which comprises mixing a basic magnesian body in finely subdivided form with sufficient bonding agent to establish a predetermined ratio therebetween, forming the mixture into a hard cake, breaking said cake to make angular granules, screening out any fines produced in breaking and firing the granules to shrink and harden the same.

9. The process of making basic magnesian refractories for basic open hearth furnaces which comprises mixing magnesite in finely subdivided form with sufficient bonding agent to establish a predetermined ratio therebetween, forming the mixture into a hard cake, breaking said cake to make angular granules, screening out any fines produced in breaking and firing the granules to shrink and harden the same.

10. The process of making basic magnesian refractories for basic open hearth furnaces which comprises converting a finely divided magnesian refractory material containing a bonding agent into a press cake with the aid of water and a little free alkaline earth, drying, breaking into angular granules and firing the granules to shrink and harden the same.

11. The process of making basic magnesian refractories for basic open hearth furnaces which comprises converting finely divided magnesite containing a bonding agent into a press cake with the aid of water and a little free alkaline earth, drying, breaking into angular granules and firing the granules to shrink and harden the same.

In testimony whereof I have hereunto affixed my signature.

ALBERT P. MEYER.